This application is a continuation-in-part of application Ser. No. 517,943 filed June 24, 1955, now Patent No. 3,097,150.

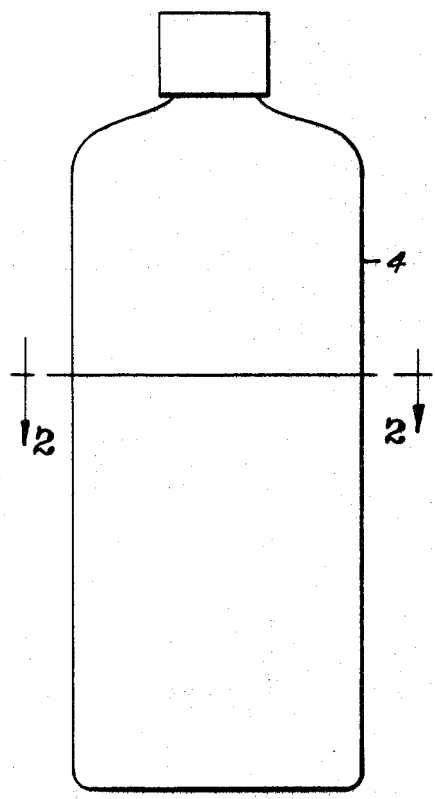
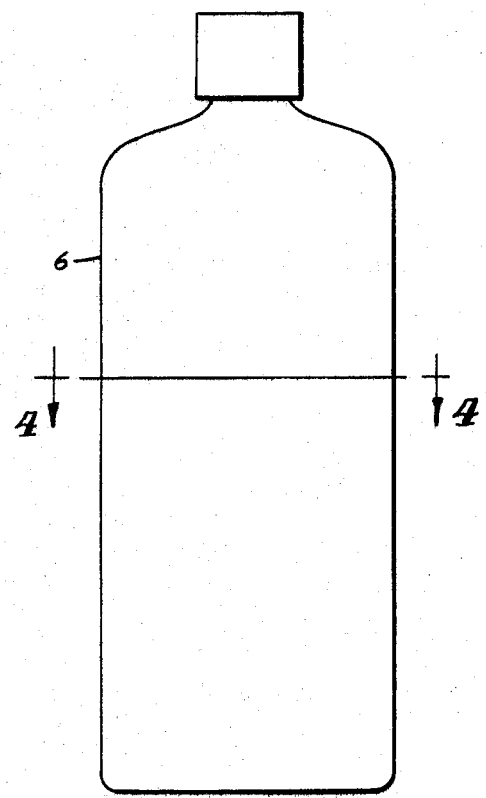
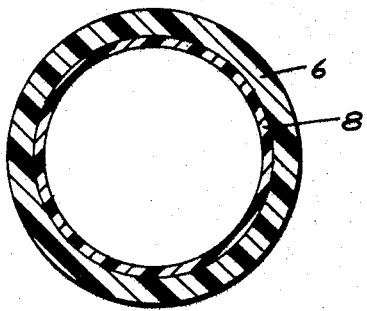
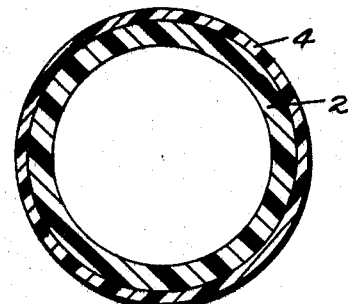
INVENTORS
WILLIAM C. RAINER
EDWARD M. REDDING
JOSEPH J. HITOV
ARTHUR W. SLOAN
WILLIAM D. STEWART 3,388,051
POLYETHYLENE GRAFT COPOLYMERS PRODUCED WITH HIGH ENERGY IONIZING RADIATION
William C. Rainer, Barrington, R.I., Edward M. Redding, Winnetka, Ill., Joseph J. Hitov, Leominster, Mass., Arthur W. Sloan, Washington, D.C., and William D. Stewart, Springfield, Va., assignors to W. R. Grace & Co., Cambridge, Mass., a corporation of Connecticut
Continuation-in-part of application Ser. No. 517,943, June 24, 1955. This application Mar. 2, 1960, Ser. No. 12,339
Claims priority, application Canada, Apr. 16, 1958, 749,695
9 Claims. (Cl. 204—159.17)

The present invention relates to condensation products of polyethylene with other polymers and ethylenically unsaturated monomers.

Polyethylene is widely used today in making containers, toys, etc. Despite its many advantages, it suffers from the disadvantage that it is too flexible and does not have sufficient strength for some uses. Additionally, it is a relatively expensive material. Certain other polymers, such as butyl rubber, while being less expensive than polyethylene, likewise do not have sufficent strength for some uses and also are insufficiently rigid. Polyisobutylene (Vistanex) also does not have sufficient strength and is insufficiently rigid.

It has previously been proposed to crosslink polyethylene by high voltage irradiation to render the polyethylene more rigid. However, for some purposes, this procedure still left something to be desired.

Attempts have also been made to cross-link other polymers by irradiation, but such attempts have not been uniformly successful. Thus, materials, such as plasticized cellulose acetate, butyl rubber (isobutylene-isoprene or butadiene copolymer), deteriorate when irradiated with a 2 mev. electron beam in a dosage of $20 \times 10^6$ rep at room temperature. Similarly, polyisobutylene deteriorates under the same conditions.

It is thus impossible to predict whether irradiation will increase, decrease or have any effect at all on the mixture of two or more polymeric materials.

It is a primary object of the present invention to prepare condensation products of polyethylene with other non-polar or slightly polar polymers and ethylenically unsaturated monomers having increased toughness and rigidity.

Another object of the invention is to reduce discoloring in graft polymerization.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained and new cross-linked polymers of increased strength and rigidity can be obtained if polyethylene is irradiated in the presence of other non-polar or only slightly polar polymers or ethylenically unsaturated monomers. Preferably, the monomers or polymers are hydrocarbons. The invention is of particular advantage with polymers of isobutylene. It is, in fact, surprising that polyisobutylene will react with polyethylene during irradiation to give a cross-linked product of increased strength and rigidity, as polyisobutylene itself and butyl rubber are deteriorated by the irradiation treatment in the absence of the polyethylene.

The products of the present invention can be molded in conventional manner, e.g., compression, extrusion, transfer and injection molding procedures can be employed.

The polyethylene can be interpolymerized with one or more other substantially non-polar polymers. Thus, the polyethylene can be replaced with up to 95%, e.g., 50%, of another non-polar polymer. When polyethylene is the predominant polymer, it is, preferably, used in an amount of 70 to 95% of the total polymers. When polyethylene is used as the minor constituent, it is present in an amount of about 5 to 30% of the total polymers.

As the modifying polymer, either as a minor constituent or as a major constituent, there can be employed solid polymers of ethylenically unsaturated hydrocarbons, such as polyisobutylene, isobutylene copolymerized with 1 to 10% of a diolefin, such as butadiene or isoprene, e.g., a 97% to 3% copolymer of isobutylene with isoprene, and other materials coming within the term butyl rubber. Patent No. 2,356,128 gives typical examples of such polymers. In place of these solid polymers, there can be used liquid polymers, such as natural rubber degraded to a molecular weight of about 5000 to 8000. Other liquid polymers which can be used are liquid GR-S (5000 to 10,000 molecular weight), dicyclopentadiene, liquid butadieneacrylonitrile low in acrylonitrile (10% to 20% acrylonitrile). There also can be used a copolymer of butadiene or other diolefins with a minor amount of methyl vinyl ketone.

Instead of mixing polyethylene with any of the above materials, it is also possible to employ grafted polymers, wherein ethylenically unsaturated monomers are grafted to polyethylene. Suitable monomers for grafting purposes include isoprene, cyclopentadiene, styrene, α-methyl styrene, alkyl substituted styrenes, such as O-vinyl toluene, p-vinyl toluene, m-vinyl toluene, and p-ethyl styrene, dialkenyl benzenes, e.g., para-divinyl benzene, ring halogenated styrenes, such as o-chlorostyrene, p-chlorostyrene, 2,4-dichlorostyrene and 2,6-dichlorostyrene, etc. The hydrocarbon monomers are preferred for grafting purposes.

Also, there can be used monomers such as alkyl acrylates and methacrylates, e.g., methyl acrylate, ethyl acrylate, methyl methacrylate, butyl acrylate, octyl acrylate, butyl methacrylate, octyl methacrylate, N,N-methylenebis-acrylamide, polyallyl esters, e.g., diallyl phthalate, diallyl oxalate, ethylene glycol dimethacrylate, triallyl cyanurate, bis-allyl carbonates, diallyl maleate, and diallyl fumarate, dialkenyl oxalates, e.g., diallyl oxalate, triallyl melamine, dialkyl maleates and fumarates, e.g., diethylmaleate and diethyl fumarate, etc.

Generally, from 5 to 30% of monomer is employed in forming the graft polymer. While the monomer may be grafted onto polyethylene in conventional fashion before irradiation, preferably the polyethylene and monomer are reacted together during the novel irradiation treatment.

The monomeric material can be applied to any convenient polyethylene substrate, e.g., polyethylene in the form of film, bottles, tubing, etc.

Irradiation can be carried out at room temperature or even below or at temperatures as high as or slightly above the transititon point of the polyethylene, e.g., 125° C. and above.

Monomers such as isoprene can also be dissolved in fluid polyethylene or other solvent. Similarly the irradiation can be carried out with the polyethylene and other polymers or monomers when emulsified in water.

While it is not essential to use an additional catalyst, it is frequently desirable to add a free radical engendering material to hasten the cross-linking and/or polymerization. Conventional materials can be employed, such as peroxy compounds, e.g., benzoyl peroxide, p-chlorobenzoyl peroxide, methyl ethyl ketone peroxide, di-t-butyl peroxide, cumene hydroperoxide, acetyl peroxide, hydrogen peroxide, persulfates, e.g., potassium, ammonium and sodium persulfate, percarbonates, e.g., sodium percarbonate, perborates, e.g., sodium perborate, azo compounds of the type described in Hunt, Patent No. 2,471,959, e.g., azo-bis-isobutyronitrile, any of the peroxides recited in Schildknecht, "Vinyl and Related Polymers" (1952), p. 78, dicumyl peroxide, etc.

The polyethylene employed should be one which is solid at room temperature and may have a molecular weight of 7,000, 12,000, 19,000, 21,000, 24,000, 30,000, 35,000 or even higher. For best results, the molecular weight should be at least 12,000 and, preferably, the molecular weight is about 20,000 to 28,000. The transition point of the polyethylene is generally about 105° to 125° C.

High, medium or low density polyethylene can be employed and the polyethylene can be manufactured by either a high or low pressure process.

In the drawings:

FIGURE 1 is a side elevation of an irradiated polyethylene bottle having an external coating of a grafted polymer.

FIGURE 2 is a sectional view taken on the line 2—2 of FIGURE 1.

FIGURE 3 is a similar view to FIGURE 1, of a bottle having an internal grafted coating.

FIGURE 4 is a sectional view taken on the line 4—4 of FIGURE 3.

Referring more specifically to the drawings there is provided in FIGURES 1 and 2 an irradiated polyethylene bottle 2 having a thin external graft coating 4 of polystyrene thereon. The graft coated bottle can be prepared by coating the outside of a polyethylene bottle with monomeric styrene and then irradiating the coated polymer to a dosage of $20 \times 10^6$ r.e.p. to form the irradiated graft polymer coated bottle.

FIGURES 3 and 5 show a similar irradiated polyethylene bottle 6 having a thin internal graft coating 8 of vinyl toluene.

The following examples illustrate typical methods of carrying out the invention. Unless otherwise stated, all parts are parts by weight.

Example 1

A mixture of 90 parts of polyethylene, molecular weight 20,000, and 10 parts of solid polyisobutylene of molecular weight 168,000, were blended together on a rubber mill into a sheet 10 mils thick. Strips one inch long ½ inch wide were cut from the sheet.

A Van de Graaff electrostatic generator, manfactured by the High-Voltage Engineering Corporation, Cambridge, Mass., was used as a source of a beam of electrons. This machine is a high voltage X-ray generator and was modified by removal of the tungsten target from the path of the electrons to thereby permit irradiation of objects at the port. The generator was operated at two million volts with an amperage of 41 microamps at the target area per inch of scan.

A strip heater, equipped with a Variac, was fitted with a clamp to hold a flat Vycor glass crucible cover. The crucible cover was the container for the polyethylene-polyisobutylene strip. The Variac was adjusted to give a temperaure of 120° to 130° C. (Previously measured by a thermocouple), and held at this temperature. The strips of the polymer blend were heated in the crucible to 120° to 130° C. (slightly above the transition point). This required about 30 seconds each. The dishes were then inserted at the point of the machine, centered and irradiated Exposure periods for the irradiation of the polyethylene-polyisobutylene were (a) 2 seconds
(b) 10 seconds
(c) 30 seconds, and
(d) 60 seconds Some improvement in the toughness and rigidity of the polymer blend was noted in irradiated sample (a) and these properties were further improved as the time of treatment was increased up to 60 seconds (sample d), which sample still had some flexibility.

Example 2

Example 1(b) was repeated, replacing the polyisobutylene by 10 parts of a solid isobutylene-isoprene copolymer, containing 97% isobutylene units to form the sheet. The polymer blend was subjected to the electron beam recited in Example 1 until it had received a dosage of $20 \times 10^6$ r.e.p. The resulting strip was tougher and more rigid than the original polymer blend. Further strengthening can be obtained in this example, if 5 parts of benzoyl peroxide are milled into the polymer blend prior to the irradiation. Alternatively, the peroxide could be added to the blend just prior to irradiation.

Example 3

80 parts of polyethylene, having a molecular weight of about 20,000 (Alathon 14) and 20 parts of soft, viscous polyisobutylene (Vistanex LM, Type MH) were blended and then irradiated in the form of a disk having a thickness of 40 mils at room temperature with the Van de Graaff 2 mev. electron accelerator. The dosage was $20 \times 10^6$ r.e.p. The resulting product will still flexible but much more tear-resistant than a corresponding blend which had not been irradiated. The process of Example 3 was also carried out with a ratio of 30 parts polyethylene to 70 parts polyisobutylene or with a ratio of 70 parts polyethylene to 30 parts polyisobutylene.

Example 4

100 parts of polyethylene (Alathon 14), 10 parts of distilled styrene (monomer) and one part of benzoyl peroxide were irradiated at room temperature, as in Example 3, until the dosage was $20 \times 10^6$ rep. The irradiated graft polymer was considerably stronger than a similar graft polymer formed without the aid of the irradiation. Methyl ethyl ketone peroxide was used with equal effect in place of benzoyl peroxide in Example 4.

Example 5

100 parts of polyethylene of molecular weight 20,000 (PM–1), 5 parts of para-divinyl benzene and 5 parts of benzoyl peroxide were irradiated at room temperature with the same electron beam as in Example 3, until the dosage was $20 \times 10^6$ rep. The resulting graft polymer was translucent, flexible and very tough. In the absence of the irradiation, a less tough graft polymer was obtained which also had objectionable yellowish-brown staining (entirely absent from the irradiated product).

Example 6

60 parts of polyethylene (Alathon 14) and 40 parts of low viscosity depolymerized natural rubber, molecular weight 5,000, were blended and irradiated as in Example 5, with a dosage of $20 \times 10^6$ rep. The cross-linked product was noticeably tougher than the non-irradiated blend. The irradiated polymer blend furthermore, did not exude the depolymerized rubber while the non-irradiated blend did exude this material to an objectionable extent and also was quite sticky.

In place of the low viscosity depolymerized rubber in this example, there can be employed high viscosity depolymerized natural rubber, molecular weight about 8,000.

Example 7

Example 4 was repeated, omitting the peroxide. The irradiated graft polymer was tough and flexible, although not as tough as the irradiated product of Example 4.

It has generally been found that a dosage level of $2 \times 10^6$ rep is necessary to obtain a sginificant increase in strength and toughness of the product. At $6 \times 10^6$ rep, the improvement is pronounced. In ascending order of dosage, these properties are progressively enhanced, being quite good at $20 \times 10^6$ rep. Increasing rigidity is also noted, being quite pronounced by $20 \times 10^6$ rep. In fact, above $50 \times 10^6$ rep, it becomes difficult to mold the products by conventional molding techniques and it is necessary to resort to pressure and vacuum post forming at dosages from 50 to $100 \times 10^6$ rep. At dosages of $200 \times 10^6$ rep and above, a permanent amber tint is imparted to products made from a substantial proportion of polyethylene.

A rep, as is recognized in the art, is defined as that amount of nuclear radiation which dissipates 93 ergs of energy per gram of tissue producing $1.61 \times 10^{12}$ ion pairs in the process. It is approximately equal to the amount of energy that would be dissipated by a one roentgen X-ray beam in a gram of tissue.

As the amount of irradiation dosage administered is increased, the polyethylene-polymer, e.g., polyisobutylene or monomer, e.g., styrene, blend diminishes in thermoplasticity until, finally, transformation is effected into a thermosetting material.

The irradiated polyethylene-polymer monomer blends of the present invention can be formed into particles in the customary manner, for example, by chopping into pellets and then the pellets can be softened and formed into films or other shapes. As an example of a molded object, the polyethylenepolyisobutylene irradiated polymer of Example 1(c) can be heated and formed into a cup. Alternatively, a disk of the irradiated polymer of Example 3 could be placed in a crown cap and molded into a cap liner with the aid of a two-step plunger.

The polyethylene-polymer or monomer blend can be irradiated at a thickness of from 3 mils or less (e.g., 1 mil), up to 100 mils or even higher, e.g., 250 mils, but is preferably about 40 to 50 mils. For thickness above 250 mils, the voltage should be above 2,000,000 and can be 3,000,000 or 6,000,000 or even higher. The lower limit of the voltage also is not particularly critical and can be 750,000 or below e.g., 20,000 volts. In any event, the voltage should be sufficiently high to induce the cross-linking necessary to give the desired increase in strength.

Ozone has an adverse effect upon polyethylene and the graft polymers thereof. Consequently, it is frequently desirable to have good ventilation or to carry out the irradiation while the polyethylenepolymer or monomer blend is in an atmosphere of inert gas, such as nitrogen or argon. Thus, the irradiation process of Example 3 can be carried out while continuously passing a stream of argon over the polyethylene-polyisobutylene blend.

It is also sometimes desirable to carry out the irradiation while the blend is maintained in a vacuum, e.g., 1 mm. or less. Thus, the irradiation in Example 3 can be carried out while the polyethylene-polyisobutylene blend is in a vacuum of 0.1 mm. total pressure.

Similarly the irradiation process of Example 4 can be carried out in an inert fluid atmosphere, e.g., while continuously passing a stream of argon over the polyethylene substrate having the styrene monomer and benzoyl peroxide on the surface thereof.

Like a polyethylene film having a thin surface coating of styrene monomer containing 10% benzoyl peroxide can be irradiated as in Example 4 at a dosage of $20 \times 10^6$ rep while the coated polyethylene is in a vacuum of 0.1 mm. total pressure.

While irradiation is preferably carried out with electrons, as set forth above, it is also possible to use other means of irradiation. Thus, if the tungsten target is put back, the machine described in Example 1 will permit X-rays to hit the polyethylene by placing the polymer by the side of the target. However, irradiation with X-rays takes longer than with electrons to obtain the same effect. It is also possible to irradiate with β-rays, e.g., by employing carbon 14, phosphorus 32, or strontium 90, as source of irradiation. Gamma-rays can be used, e.g., by submitting the polyethylene to irradiation from iron 59 or cobalt 60. Neutrons, protons, α-particles and deuterons also may be employed to bombard the polyethylene.

Any high energy ionizing or particle irradiation source can be employed.

Instead of using the Van de Graaff electrostatic generator as the source of the electron beam, other sources of high energy electrons can be employed, such as the General Electric 800,000 volt resonant transformer unit described by Lawton et al. in Industrial and Engineering Chemistry, vol. 46, pp. 1703 to 1709.

There can also be employed other conventional apparatus for producing beams of electrons, such as those recited, for example, in Brophy, Patent No. 2,668,133, column 3, lines 5 to 29.

As previously pointed out, for many useful results, the irradiation dose should be about $20 \times 10^6$ rep and the polyethylene should have a molecular weight before irradiation of about 20,000 or above. With polyethylene having a molecular weight of 7,000, it is necessary to employ a dosage of at least $100 \times 10^6$ rep in order to get satisfactory cross-linking and even higher dosages are necessary for lower molecular weight polymers. Correspondingly lower dosages can be employed to obtain cross-linking of higher molecular weight polymers.

The polyethylene-polyisobutylene, e.g., 80 parts polyethylene mol. wt. 28,000 and 20 parts solid Vistanex, (or other polymer blend) can be shaped, e.g., in the form of a bottle and then irradiated to increase the strength of the formed article.

The cross-linked irradiated products of the present invention also have increased heat resistance, in contrast to the non-irradiated blends. In addition to the uses previously mentioned, the products of the invention can be employed in making flexible bags, squeeze bottles, beakers, etc.

Example 8

Using the Van de Graaff electron generator described in Example 1 polyethylene bottles were flush coated with vinyl acetate and irradiated at dosages of $2 \times 10^6$ rep, $10 \times 10^6$ rep and $20 \times 10^6$ rep.

Example 9

Example 8 was repeated replacing the vinyl acetate coating with a methyl methacrylate coating. At the $20 \times 10^6$ rep dosage the monomer formed a solidified coating on the bottle. The bottle receiving a $10 \times 10^6$ rep dosage still showed some evidence of liquid being present.

Example 10

Example 8 was repeated using acrylonitrile as the monomer coating. At the 10 megarep dosage the monomer was liquid at the end of the irradiation treatment. Within 5 minutes, however, a brownish vaporization took place throughout and wherever droplets were present solidification occurred. At $20 \times 10^6$ rep the acrylonitrile was solidified and the entire bottle wall was brownish in color.

Example 11

Example 8 was repeated utilizing ethyl acrylate as the monomer coating and using a dosage of $20 \times 10^6$ rep only. The monomer coating solidified. The same result was obtained with n-butyl acrylate as the monomer coating under these conditions.

Example 12

Example 8 was repeated utilizing ethylene glycol dimethacrylate as the monomer coating and using a dosage of $20\times10^6$ rep. The coating solidified but did not wet the polyethylene. Hence a readily peelable coating was formed.

Example 13

Example 8 was repeated utilizing isoprene monomer as the coating at $20\times10^6$ rep. A solidified coating occurred.

Example 14

Example 8 was repeated utilizing styrene monomer as the coating. The coating did not solidify during the irradiation but did solidify within one hour after irradiation.

In the following example, polyethylene bottles were filled with the various indicated monomers and emptied after 4 hours and irradiated. Utilizing vinyl acetate, methyl methacrylate and acrylonitrile at 20 megarep a solidified inner coating was formed. This was true for acrylonitrile at 12 megarep as well.

When a 50–50 mixture of isoprene and acrylonitrile was utilized, a solidified inner coating was also formed at 20 megarep.

A polyethylene bottle was likewise coated with a 5% solution of polyvinyl alcohol and irradiate at $20\times10^6$ rep. The coating was partly solidified. The polyvinyl alcohol solution had the following composition:

| | Parts |
|---|---|
| Elvanol 72–60 (polyvinyl alcohol) | 5 |
| Glycerine | 3 |
| Tergitol 7 (an anionic detergent) | 0.25 |
| Water | 91.75 |

What is claimed is:

1. A graft polymer of irradiated polyethylene with a polymer of styrene, said styrene polymer being formed in the presence of said polyethylene, said irradiation being to an extent of at least $2\times10^6$ rep.

2. A bottle made of irradiated polyethylene, the irradiation being to an extent of at least $2\times10^6$ rep, having grafted thereto a polymer formed by polymerizing a material selected from the group consisting of a polymerizable ethylenically unsaturated hydrocarbon monomer other than ethylene, alkyl acrylates and alkyl methacrylates.

3. A bottle as in claim 2 wherein the polymer is grafted as an exterior coating on the bottle.

4. A bottle as in claim 2 wherein the polymer is grafted as an interior coating on the bottle.

5. A bottle made of irradiated polyethylene, the irradiation being to an extent of at least $2\times10^6$ rep, having grafted thereto a polymer formed by polymerizing styrene.

6. A graft polymer of irradiated polyethylene with a polymer of a member of the group consisting of styrene, divinyl benzene and methyl methacrylate, said polymer being formed in the presence of said polyethylene, said irradiation being to an extent of at least $2\times10^6$ rep.

7. A graft polymer of irradiated polyethylene with a polymer of a member of the group consisting of styrene and divinyl benzene, said polymer being formed in the presence of said polyethylene, said irradiation being to an extent of at least $2\times10^6$ rep.

8. A bottle according to claim 2 wherein the material polymerized is divinyl benzene.

9. A bottle according to claim 2 wherein the material polymerized is methyl methacrylate.

References Cited

UNITED STATES PATENTS

| 2,936,261 | 5/1960 | Cole | 204—159.17 |
| 2,670,483 | 3/1954 | Brophy | 204—159.17 |
| 2,919,473 | 1/1960 | Cole | 204—159.17 |

FOREIGN PATENTS 546,816  10/1956  Belgium.

OTHER REFERENCES

Lawton et al.: "Nature," July 11, 1953, pp. 76, 77.

MURRAY TILLMAN, *Primary Examiner.*

J. R. SPECK, GEORGE F. LESMES, J. REBOLD, *Examiners.*

T. TUNG, R. B. TURER, *Assistant Examiners.*